United States Patent [19]
Ito et al.

[11] Patent Number: 5,392,347
[45] Date of Patent: Feb. 21, 1995

[54] RINGING TONE SIGNAL DETECTING CIRCUIT

[75] Inventors: Tomokazu Ito; Yasunari Shida, Tokyo, both of Japan

[73] Assignee: NEC Corporation, Tokyo, Japan

[21] Appl. No.: 9,326

[22] Filed: Jan. 26, 1993

[30] Foreign Application Priority Data

Feb. 19, 1992 [JP] Japan .................................. 4-032201
May 20, 1992 [JP] Japan .................................. 4-126960

[51] Int. Cl.⁶ ........................................... H03K 9/06
[52] U.S. Cl. .................................... 379/372; 379/386; 375/94; 327/47; 327/49
[58] Field of Search ............... 379/373, 374, 375, 372, 379/377, 386; 375/94; 328/136, 138, 140; 307/522, 523, 528

[56] References Cited

U.S. PATENT DOCUMENTS

| | | | |
|---|---|---|---|
| 3,634,772 | 1/1972 | Katz | 328/138 |
| 4,064,488 | 12/1977 | Chapman | 328/136 |
| 4,325,030 | 4/1982 | Colamonico | 328/140 |
| 4,363,100 | 12/1982 | Agnew et al. | 379/386 |
| 4,390,843 | 6/1983 | Betts et al. | 379/373 |
| 4,405,837 | 9/1983 | Ecklund | 307/522 |
| 4,536,619 | 8/1985 | Hamatani et al. | 379/386 |
| 4,975,594 | 12/1990 | Wiren | 307/522 |
| 5,099,497 | 3/1992 | Ohno et al. | 375/20 |
| 5,189,378 | 2/1993 | Arai | 328/138 |

FOREIGN PATENT DOCUMENTS

| | | | |
|---|---|---|---|
| 0031950 | 3/1978 | Japan | 328/138 |
| 58-123227 | 7/1983 | Japan . | |
| 0180265 | 9/1985 | Japan | 379/373 |

*Primary Examiner*—James L. Dwyer
*Assistant Examiner*—Scott L. Weaver
*Attorney, Agent, or Firm*—Whitham, Curtis, Whitham & McGinn

[57] ABSTRACT

A ringing tone signal detecting circuit detects a ringing tone signal from a received signal of the echo canceler type which is supplied from a subscriber line through a hybrid circuit. The ringing tone signal detecting circuit has a sampler for sampling the received signal at a predetermined sampling frequency, a comparator for comparing an output signal from the sampler with a predetermined threshold value and producing a binary digital signal, a plurality of first through nth delay circuits for delaying the binary digital signal from the comparator for 1 through n sampling times, respectively, and a frequency detector for detecting a ringing tone signal from the binary digital signal from the comparator and output signals from the first through nth delay circuits. The circuit has particular use in detecting the ringing tone signals in the 2B1Q signaling code scheme.

4 Claims, 8 Drawing Sheets

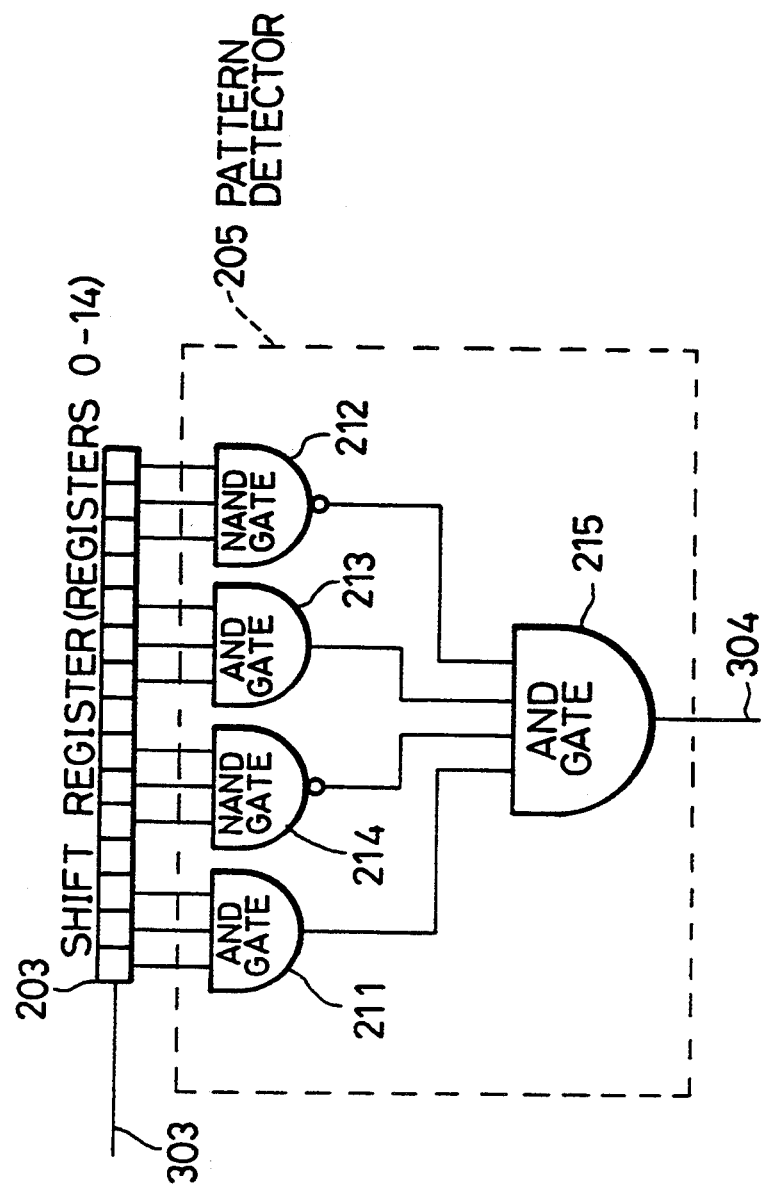

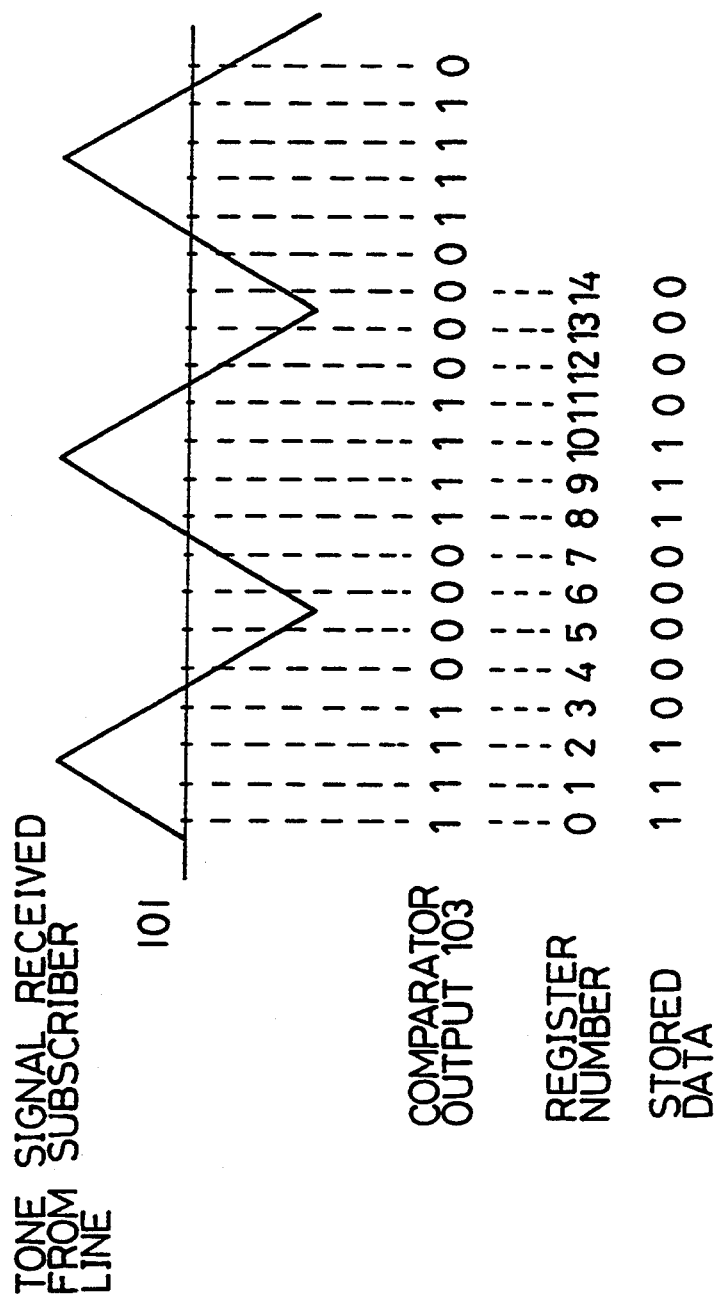

RINGING TONE SIGNAL DETECTING CIRCUIT

BACKGROUND OF THE INVENTION

1. Field of the Invention

The present invention relates to a ringing tone signal detecting circuit, and mote particularly to a ringing tone signal detecting circuit for use in an echo-canceler digital subscriber line transmission system which employs paired metallic cables.

2. Description of the Related Art

In a digital subscriber line transmission system, a ringing signal called a tone signal is transmitted over a subscriber line to call the terminal of a called subscriber. The terminal has a ringing tone signal detecting circuit for receiving and detecting the tone signal from the subscriber line.

A digital subscriber line transmission system according to North American Standards has a transmission rate of 80 kHz and employs, as a transmission code, a 2B1Q code composed of foyer values of $\pm 1$, $\pm 3$. The ringing tone signal comprises successive $\pm 3$ signals having a frequency of 10 kHz, as indicated as a received signal (tone signal) a in FIG. 5 of the accompanying drawings. More specifically, a $+3$ signal is transmitted four times at a trans, mission rate of 80 kHz, and thereafter a $-3$ signal is transmitted four times. Such a signal transmission cycle is repeated ten times for 3 msec., thereby producing a tone signal.

FIGS. 2($a$) and 2($b$) of the accompanying drawings show simulated tone signal waveforms that are received. In FIG. 2($a$), the tone signal waveform is generated when the subscriber line is 0 m long, i.e., when the subscribers are directly coupled. In FIG. 2($b$), the tone signal waveform is generated when the subscriber line is 7 km long and has a diameter of 0.5 mm. It can be seen from FIGS. 2($a$) and 2($b$) that though the illustrated tone signal waveforms have different voltage levels, they are similar to sine wave-forms.

FIG. 1 of the accompanying drawings shows a conventional ringing tone signal detecting circuit. The conventional ringing tone signal detecting circuit, generally denoted at 3, has a bandpass filter 4, a full-wave rectifier 5, a low-pass filter 6, and a comparator 7.

An analog signal 11 that has been propagated through subscriber line 1 and received by a hybrid circuit 2 is supplied to the bandpass filter 4. Since a 10 kHz signal is used as a tone signal in an echo-canceler digital subscriber line transmission system, the bandpass filter 4 has a central frequency of 10 kHz. A signal component of 10 kHz that is detected by the bandpass filter 4 is then applied to the full-wave rectifier 5 which rectifies the signal. The rectified signal is then converted into a DC signal component by the low-pass filter 6. The DC signal component detected by the low-pass filter 6 is applied to the comparator 7. The comparator 7 compares the DC signal component with a predetermined threshold voltage to determine whether the received signal is a tone signal or not. The conventional ringing tone signal detecting circuit 3 shown in FIG. 1 is of the power detection type because it determines whether the received signal is a tone signal or not based one the power of the received signal.

Since the power of the 10 kHz signal component contained in the received analog signal is extracted only by the bandpass filter 4, any signals other than the tone signal are erroneously detected as the tone signal insofar as they contain the 10 kHz signal component which is of the same frequency as that of the tone signal. For example, if a noise signal as shown in FIG. 3 of the accompanying drawing is applied as a received signal upon a lightning surge, the signal is mistaken as the tone signal due to the 10 kHz signal component contained in the signal. Furthermore, ordinary received signals may sometimes be detected as the tone signal.

The conventional ringing tone signal detecting circuit 3 of the power detection type tends to erroneously detect a near-end crosstalk as the tone signal because the power of the tone signal is attenuated, especially if the transmission length is long.

The conventional ringing tone signal detecting circuit 3 has another problem in that the bandpass filter 4, the full-wave rectifier 5, and the low-pass filter 6, which are in the form of analog circuits, suffer large characteristic charges owing to aging, temperature variations, and manufacturing errors.

SUMMARY OF THE INVENTION

It is an object of the present invention to provide a ringing tone signal detecting circuit which does not detect noise received upon a lightning surge, ordinary signals, and near-end crosstalks as a ringing tone signal in an echo-canceler digital subscriber line transmission system.

Another object of the present invention is to provide a ringing tone signal detecting circuit which may easily be designed in the form of an integrated circuit for digital processing input signals, which may be reduced in size, and which is less subject to characteristic changes owing to aging, temperature variations, and manufacturing errors.

According to the present invention, there is provided a ringing tone signal detecting circuit for detecting a ringing tone signal from a received signal of the echo canceler type which is supplied from a subscriber line through a hybrid circuit, comprising a sampler for sampling the received signal at a predetermined sampling frequency, a comparator for comparing an output signal from the sampler with a predetermined threshold value and producing a binary digital signal, a plurality of first through nth delay circuits for delaying the binary digital signal from the comparator for 1 through n sampling times, irrespectively, and a frequency detector for detecting a ringing tone signal from the binary digital signal from the comparator and output signals from the first through nth delay circuits.

The frequency detector may comprise a pattern detector for detecting a signal pattern of the ringing tone signal from the binary digital signal from the comparator and the output signals from the first through nth delay circuits, and a level detecting counter for producing a detected signal indicative of the detection of the ringing tone signal when an output signal produced from the pattern detector and indicating a detected signal pattern is of a high level a predetermined number of times.

The first through nth delay circuits may include first through seventh delay circuits, and the pattern detector may comprise a first AND gate for calculating a logical product of the binary digital signal from the comparator and output signals from the first, second and third delay circuits, a NOR gate for calculating an inverted logical sum of output signals from the fourth, fifth, sixth and seventh delay circuits, and a second AND gate for calculating a logical product of an output signal from the first AND gate and an output signal from the NOR gate.

The level detecting counter may comprise a timer triggerable by the output signal from the pattern detector, and a counter responsive to an output signal from the timer for counting the output signal from the pattern detector to produce the detected signal indicative of the detection of the ringing tone signal.

The comparator may comprise means for supplying alternating patterns of successive binary digital signals "1" and "0" to the pattern detector, and the level detecting counter comprises means for producing a detected signal "1" indicative of the detection of the ringing tone signal when the alternating patterns are detected by the pattern detector a predetermined number of times without referring to the final binary digital signal "1" in each alternating pattern of successive binary digital signals "1" and the final binary digital signal "0" in each alternating pattern of successive binary digital signals "0".

The sampling frequency is 80 kHz, and the ringing tone signal has a frequency of 10 kHz.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 is a block diagram of a shift register and a pattern detector in the ringing tone signal detecting circuit shown in FIG. 6; and FIG. 8 is a timing chart showing the manner in which the ringing tone signal detecting circuit shown in FIG. 6 operates.

DESCRIPTION OF THE PREFERRED EMBODIMENTS

Figure 1:
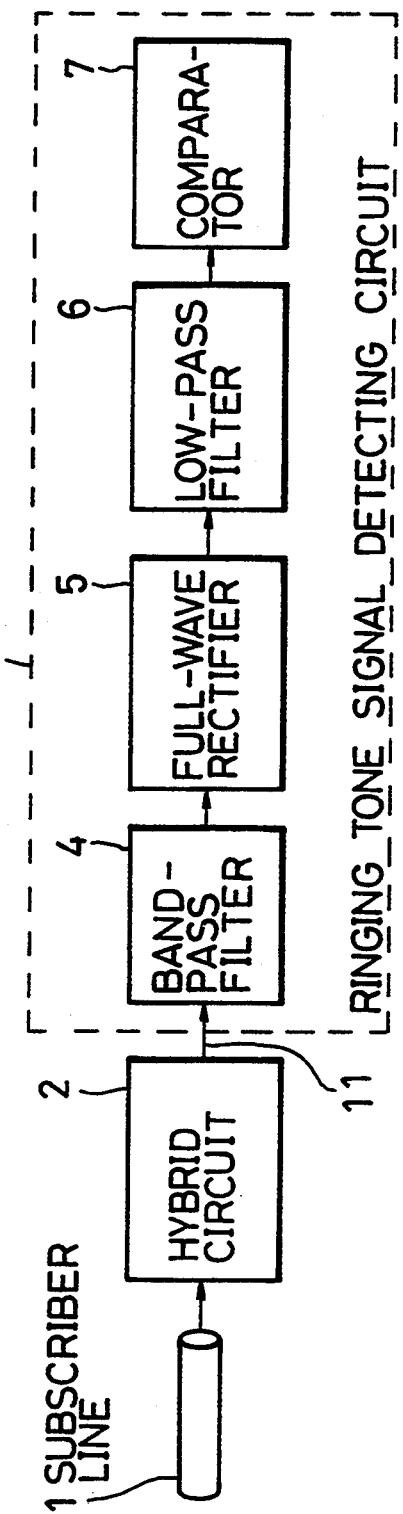
FIG. 1 is a block diagram of a conventional ringing tone signal detecting circuit.
Figure 2A:
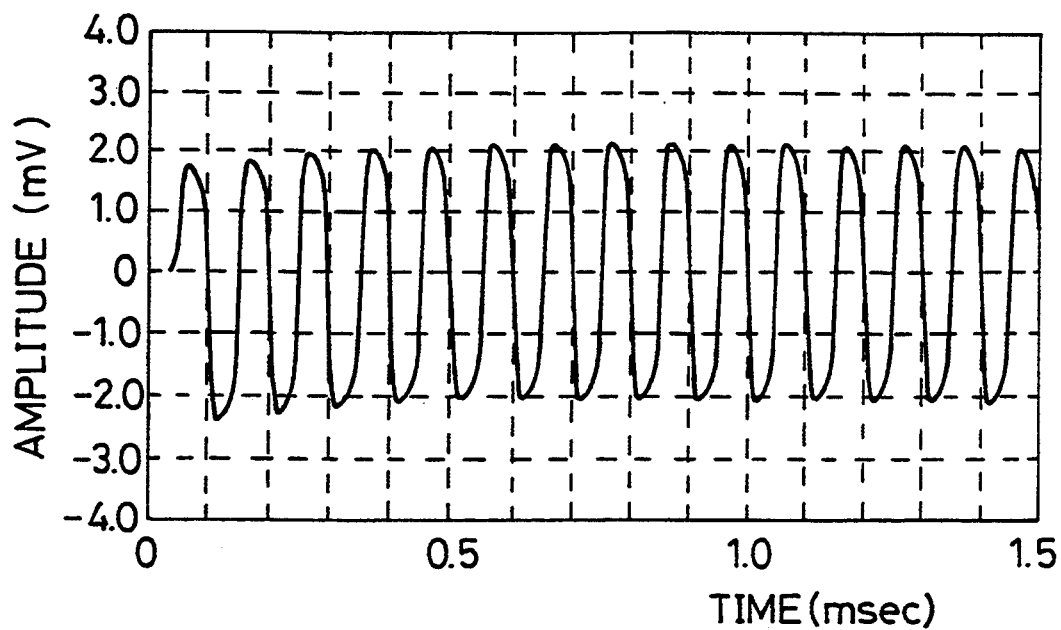
FIGS. 2(a) and 2(b) are diagrams of simulated tone signal waveforms, FIG. 2(a) showing a tone signal waveform which is generated when the subscriber line is 0 m long, i.e., when the subscribers are directly coupled, and FIG. 2(b) showing a tone signal waveform which is generated when the subscriber line is 7 km long and has a diameter of 0.5 mm.
Figure 2B:
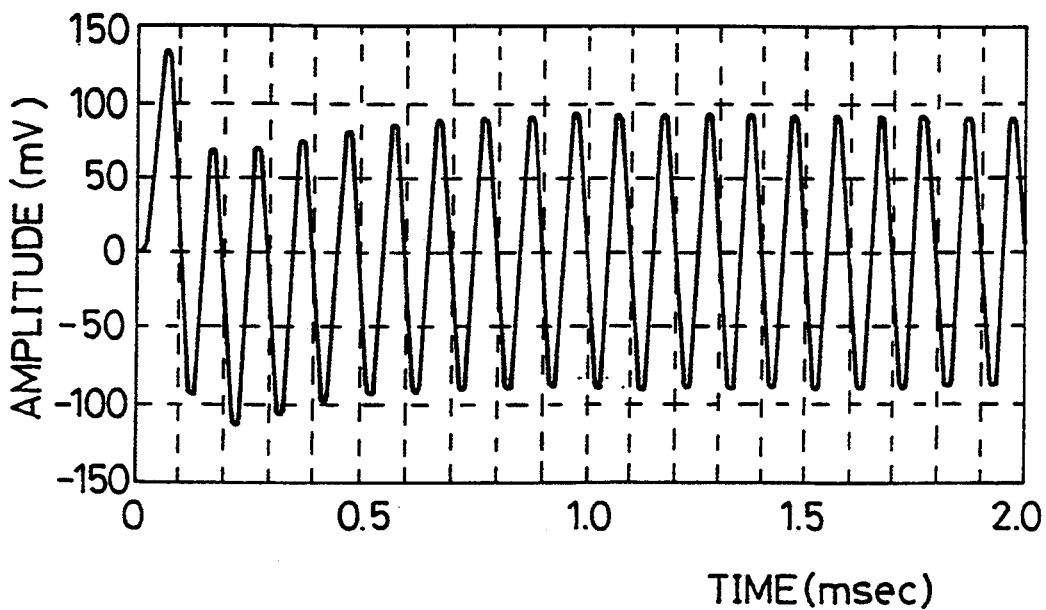
Figure 3:
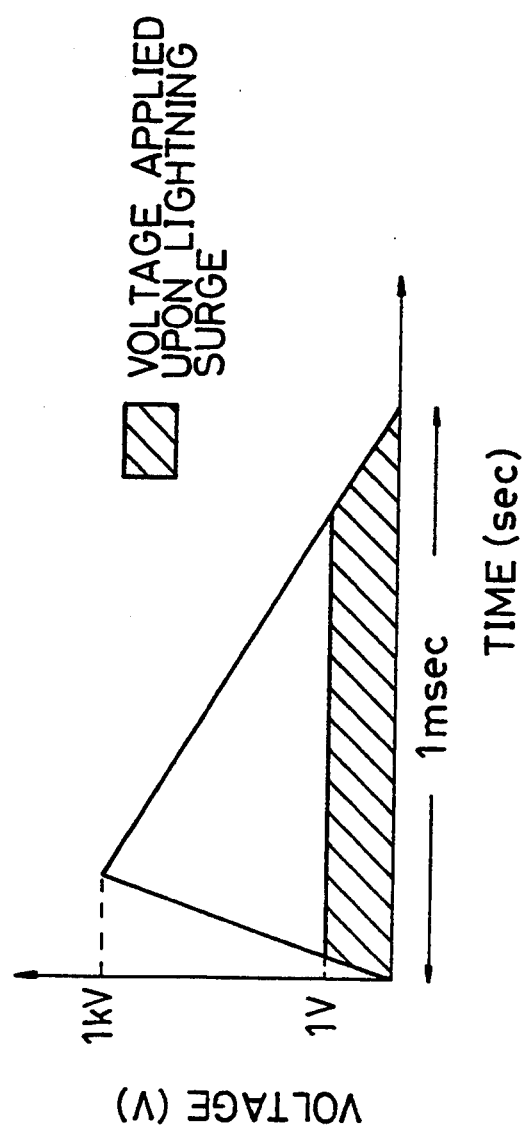
FIG. 3 is a diagram of the waveform of a noise signal received upon a lightning surge.
Figure 4:
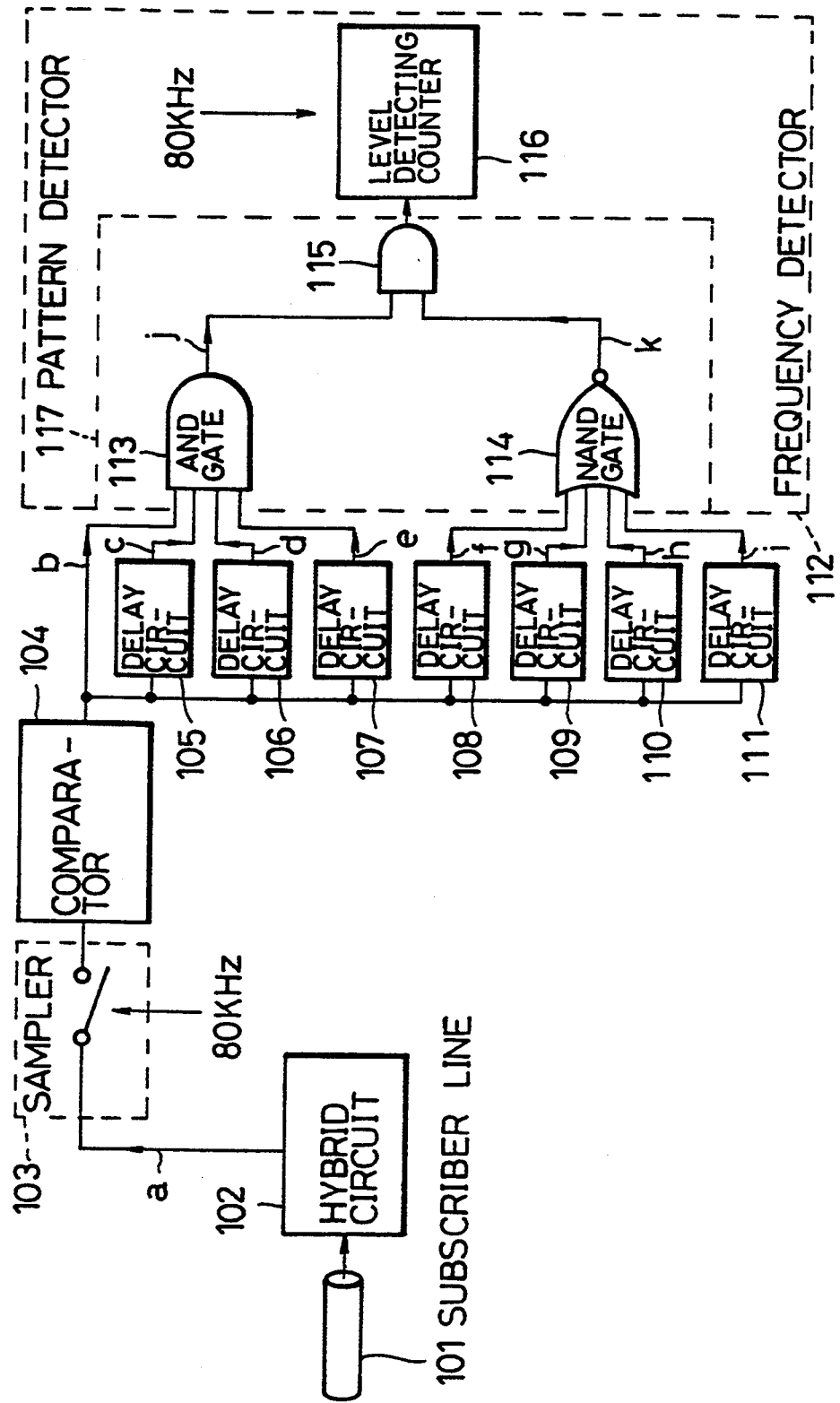
FIG. 4 is a block diagram of a ringing tone signal detecting circuit according to a first embodiment of the present invention.

As shown in FIG. 4, a ringing tone signal detecting circuit according to a first embodiment of the present invention comprises a sampler 103, a comparator 104, a plurality of delay circuits 105 through 111, and a frequency detector 112.

The sampler 103 samples, with a sampling signal having a sampling frequency of 80 kHz, a received signal a of the echo-canceler type which is supplied from a subscriber line 101 through a hybrid circuit 102.

The comparator 104 compares an output signal from the sampler 103 with predetermined threshold voltage, and produces a binary digital signal as an output signal b. The delay circuits 105 through 111 delay the output signal b from the comparator 104 for one sampling time, two sampling times, ..., seven sampling times, respectively.

The frequency detector 112 has a pattern detector 117 and a level detecting counter 116. The pattern detector 117 comprises AND gates 113, 115, and a NOR gate 114. The AND gate 113 calculates a logical product of the output signal b from the comparator 104 and output signals c, d, e from the delay circuits 105, 106, 107. The NOR gate 114 calculates an inverted logical sum of output signals f, g, h, i from the delay circuits 108, 109, 110, 111. The AND gate 115 calculates a logical product of output signal j from the AND gate 113 and the output signal k from the NOR gate 114. The level detecting counter 116 latches the output signal l from the AND gate 115 in each sampling period, and produces a detected signal indicative of the detection of a ringing tone signal when the latched output signal l is of "1" (high level) ten times.

Figure 5:
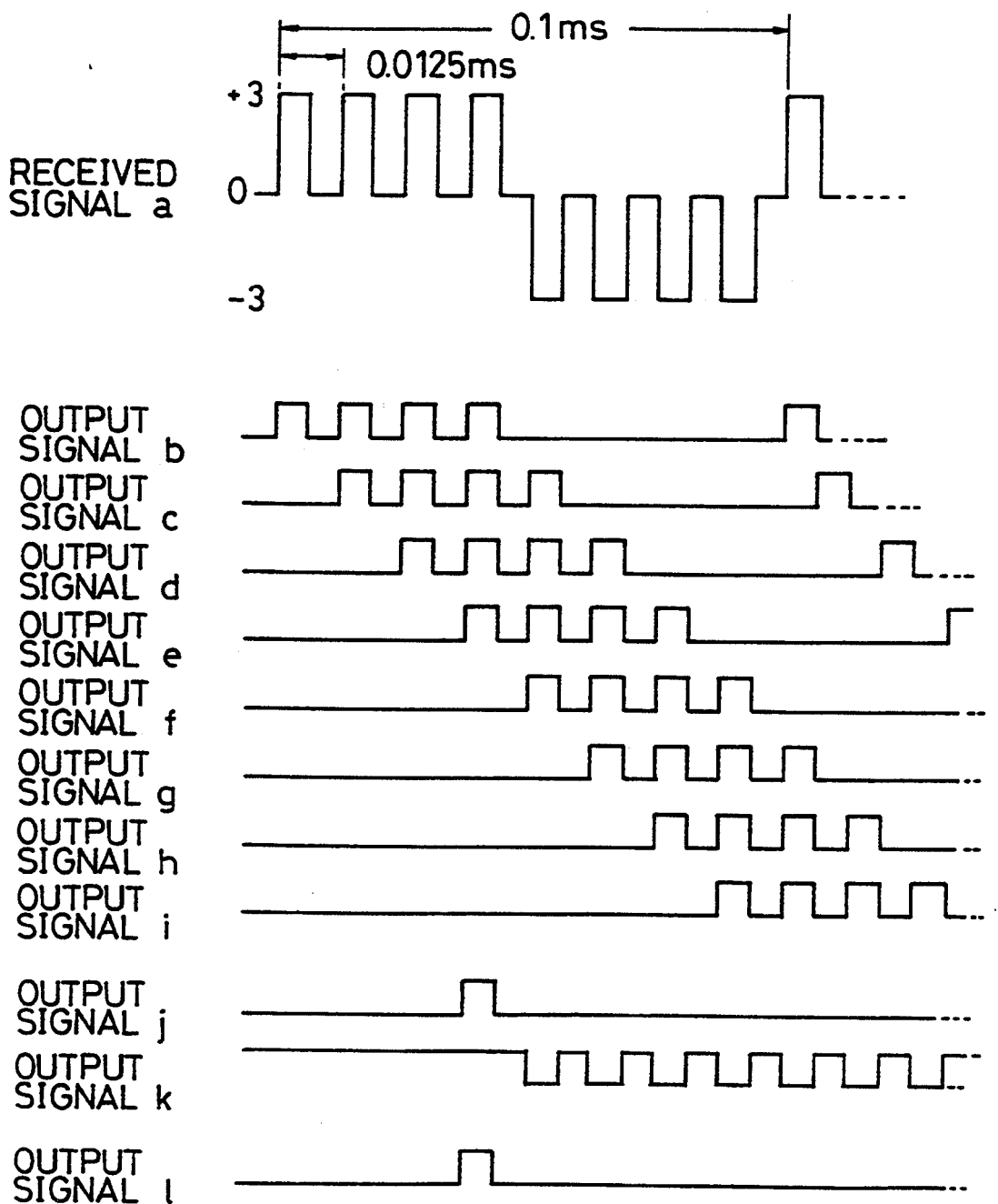
FIG. 5 is a timing chart showing the manner in which the ringing tone signal detecting circuit shown in FIG. 4 operates.

Operation of the ringing tone signal detecting circuit shown in FIG. 4 will be described below with reference to FIG. 5.

A received signal a supplied from the subscriber line 101 through the hybrid circuit 102 is applied to the sampler 103, and sampled thereby at the frequency of 80 kHz. The sampled signal is then fed to the comparator 104, which converts the sampled signal into a binary digital signal of "1" or "0" depending on whether the sampled signal is positive or negative. The binary digital signal is produced as an output signal b from the comparator 104.

The output signal b is applied to the delay circuits 105 through 111 and also the AND gate 113. The output signal b from the comparator 104 is delayed by the delay circuits 105 through 111 for one sampling time, two sampling times, ..., seven sampling times, respectively, and the delay circuits 105 through 111 produce respective delayed output signals c through i. The AND gate 113, which is supplied with the output signals b, c, d, e, produce an output signal j of "1" only when all of the supplied output signals b, c, d, e are of "1". The NOR gate 114, which is supplied with the output signals f, g, h, i, produce an output signal k of "1" only when all of the supplied output signals f, g, h, i are of "0". The AND gate 115, which is supplied with the output signals j, k, produces an output signal l of "1" only when both the output signals j and k are "1".

Therefore, the AND gate 115 produces an output signal l of "1" only when all of the output signals b, c, d, e supplied to the AND gate 113 are of "1" and all of the output signals f, g, h, i supplied to the NOR gate 114 are of "0". The period in which the AND gate 115 produces an output signal l of "1" is the same as the period of a signal of 10 kHz in view of the fact that the sampling frequency is 80 kHz. Stated otherwise, when the AND gate 115 produces an output signal l of "1", a signal of 10 kHz is applied to the ringing tone signal detecting circuit.

The level detecting counter 116 latches the output signal l from the AND gate 115 in each sampling period, thus detecting the output signal l of "1". When the level detecting counter 116 counts the output signal l of "1" ten times, it produces a detected signal indicating the detection of a ringing tone signal.

A ringing signal detecting circuit according to a second embodiment of the present invention will next be described below with reference to FIGS. 6, 7, and 8.

Figure 6:
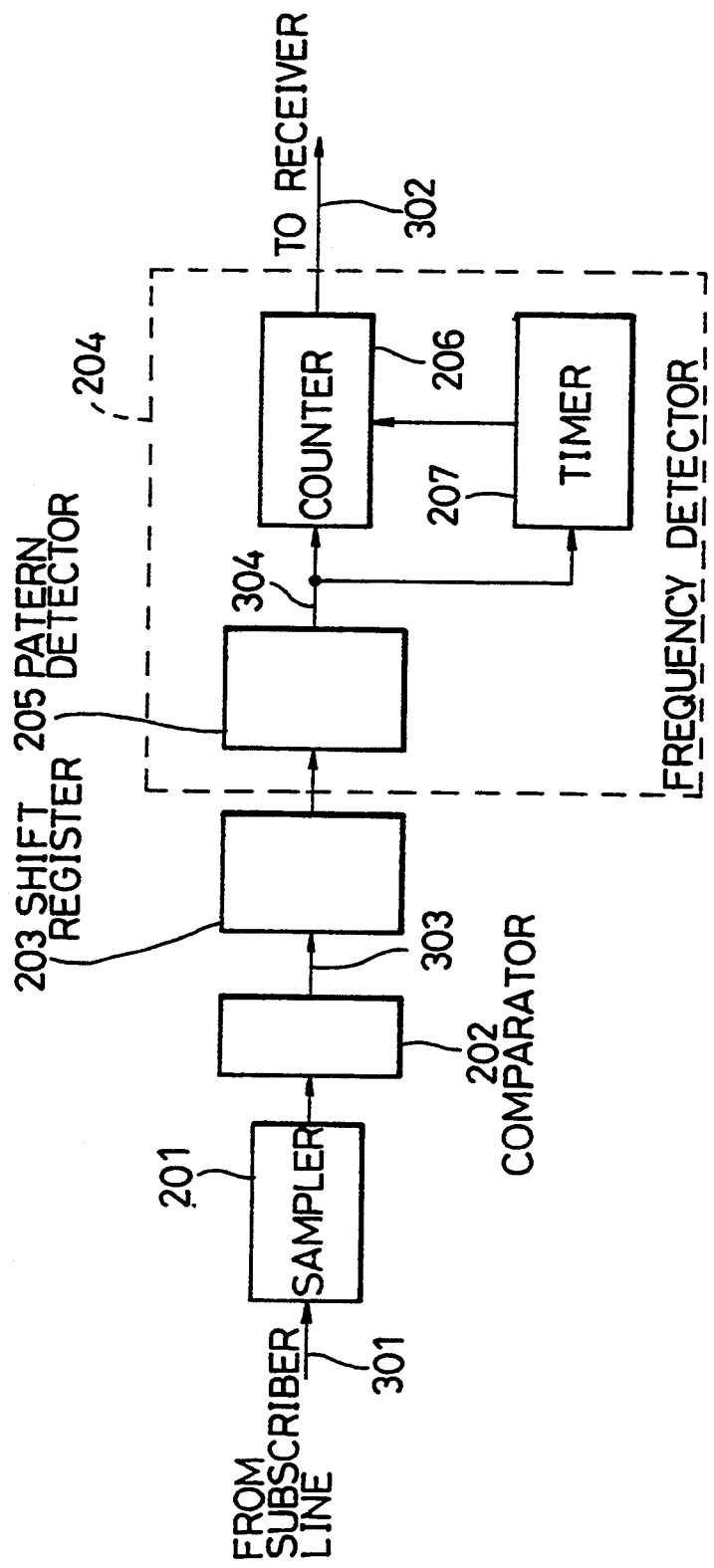
FIG. 6 is a block diagram of a ringing tone signal detecting circuit according to a second embodiment of the present invention.

As shown in FIG. 6, the ringing tone signal detecting circuit comprises a sampler 201, a comparator 202, a shift register 203, and a frequency detector 204. The frequency detector 204 has a pattern detector 205, a counter 206, and a timer 207.

The sampler 201 samples a tone signal received from a subscriber line with a sampling signal having a sampling frequency of 80 kHz. The comparator 202 is supplied with the sampled signal from the sampler 201, and produces a binary digital signal 303 of "1" when the sampled signal is positive and a binary digital signal 303 of "0" when the sampled signal is negative, as shown in FIG. 8 (b).

As shown in FIG. 7, the shift register 203 comprises a register 0, a register 1, . . . , and a register 14. The pattern detector 205 comprises a pair of three-input AND gates 211, 213, a pair of three-input NAND gates 212, 214, and a four-input AND gate 215. The pattern detector 205 produces a pattern detecting signal 304 of "1" only when the output signal 303 from the comparator 202 which is stored in the registers 0 though 14 agrees with a pattern indicated by stored data corresponding to the register numbers as shown in FIG. 8. The stored data at the register numbers 3, 11 are "D", and are not compared with the output signal 303 from the comparator 202. This is because when the sampling point at the sampler 102 is close to a switching point between the positive and negative values of the ringing tone signal, if the signal level at this point is low and a near-end crosstalk is relatively high in level, the output signal from the comparator 202 will then differ from the expected value. If a pattern were detected using all data stored in the shift register 203, then it would not be possible to detect a ringing tone signal. Therefore, data that is not to be compared with the output signal 303 from the comparator 202 is included in half the period of the ringing tone signal for protection from a near-end crosstalk.

The timer 207 is set to a time 32T (T=1/80 kHz), and is started when the pattern detecting signal 304 of "1" is applied from the pattern detector 205. The counter 206, which comprises a 2-bit counter, counts up by one when the pattern detecting signal 304 of "1" is applied from the pattern detector 205. When the pattern detecting signal 304 of "1 " is applied four times from the pattern detector 205 before a time-out of the timer 207 occurs, the counter 206 determines that the received signal is a ringing tone signal, and produces a detected signal 302 indicative of the detection of a ringing tone Signal. Upon a time-out of the timer 207, the timer 207 resets the counter 206 and is inactivated.

Although certain preferred embodiments of the present invention have been shown and described in detail, it should be understood that various changes and modifications may be made therein without departing from the scope of the appended claims.

What is claimed is:

1. A ringing tone signal detecting circuit for detecting a ringing tone signal from a received signal which is supplied from a digital subscriber line through a hybrid circuit, comprising:
   a sampler for sampling the received signal at a predetermined sampling frequency;
   a comparator for comparing an output signal from said sampler with a predetermined threshold value to produce a binary digital signal;
   first through seventh delay circuits connected in series for delaying the binary digital signal from said comparator, each delay circuit delaying the binary digital signal by a period corresponding to a period of said predetermined sampling frequency; and
   a pattern detector for detecting a signal pattern of the ringing tone signal from the binary digital signal comprising
      a first AND gate for providing an output signal that is a logical product of the binary digital signal from said comparator and output signals from the first, second and third delay circuits,
      a NOR gate for providing an output signal that is an inverted logical sum of output signals from the fourth, fifth, sixth and seventh delay circuits, and
      a second AND gate for providing an output signal of said pattern detector by providing an output signal that is a logical product of the output signal from said first AND gate and the output signal from said NOR gate;
   a timer triggerable by the output signal of said pattern detector to generate an output signal for a predetermined time period; and
   a counter responsive to the output signal from said timer for counting the output signal of said pattern detector to produce a detecting signal indicating detection of the ringing tone signal when the output signal of said pattern detector indicates a high level a predetermined number of times during said predetermined time period.

2. A ringing tone signal detecting circuit according to claim 1, wherein said predetermined sampling frequency is 80 Khz, and said ringing tone signal is a frequency of 10 kHz.

3. A ringing tone signal detecting circuit for detecting a ringing tone signal from a received signal which is supplied from a digital subscriber line through a hybrid circuit, comprising:
   a sampler for sampling the received signal at a predetermined sampling frequency;
   a comparator for comparing an output signal from said sampler with a predetermined threshold value to produce a binary digital signal;
   a shift register having first through fifteenth stages for delaying the binary digital signal from said comparator, each stage delaying the binary digital signal by a period corresponding to a period of said predetermined sampling frequency; and
   a pattern detector for detecting a signal pattern of the ringing tone signal from the binary digital signal comprising
      a first AND gate for providing an output signal that is a logical product of the binary digital signal from the first, second and third stages,
      a first NAND gate for providing an output signal that is an inverted logical product of output signals from the fifth, sixth and seventh stages,
      a second AND gate for providing an output signal that is a logical product of the binary digital signal from the ninth, tenth and eleventh stages,
      a second NAND gate for calculating an inverted logical product of output signals from the thirteenth, fourteenth and fifteenth stages, and a third AND gate providing an output signal of said pattern detector by providing an output signal that is a logical product of the output signals from said first and second AND gates and the output signals from said first and second NAND gates;

a timer triggerable by the output signal of said pattern detector to generate an output signal for a predetermined time period; and a counter responsive to the output signal from said timer for counting the output signal from said pattern detector to produce a detecting signal indicating detection of the ringing tone signal when the output signal of said pattern detector indicates a high level a predetermined number of times during said predetermined time period.

4. A ringing tone signal detecting circuit according to claim 3, wherein said predetermined sampling frequency is 80 kHz, and said ringing tone signal is a frequency of 10 kHz.

* * * * *